United States Patent
Ghosh

(10) Patent No.: US 8,448,139 B2
(45) Date of Patent: May 21, 2013

(54) AUTOMATIC CORRECTION OF APPLICATION BASED ON RUNTIME BEHAVIOR

(75) Inventor: Anup K. Ghosh, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 12/573,421

(22) Filed: Oct. 5, 2009

(65) Prior Publication Data

US 2011/0083044 A1   Apr. 7, 2011

(51) Int. Cl.
G06F 9/44 (2006.01)
(52) U.S. Cl.
USPC .......................................................... 717/124
(58) Field of Classification Search
USPC ................................... 717/24–135; 714/E11
See application file for complete search history.

(56) References Cited

U.S. PATENT DOCUMENTS

| | | | |
|---|---|---|---|
| 6,301,700 B1* | 10/2001 | Choi et al. | 717/116 |
| 6,513,154 B1 | 1/2003 | Porterfield | |
| 6,748,583 B2* | 6/2004 | Aizenbud-Reshef et al. | 717/127 |
| 7,478,367 B2* | 1/2009 | Morgan et al. | 717/124 |
| 8,015,552 B1* | 9/2011 | Lindahl et al. | 717/128 |
| 2002/0199173 A1* | 12/2002 | Bowen | 717/129 |
| 2004/0117803 A1 | 6/2004 | Srivastava et al. | |
| 2005/0251794 A1* | 11/2005 | Taylor et al. | 717/148 |
| 2006/0206873 A1* | 9/2006 | Argade | 717/135 |
| 2006/0242627 A1* | 10/2006 | Wygodny et al. | 717/128 |
| 2007/0022412 A1* | 1/2007 | Tirumalai et al. | 717/140 |
| 2007/0089075 A1* | 4/2007 | Ward | 716/4 |
| 2007/0240125 A1* | 10/2007 | Degenhardt et al. | 717/129 |
| 2008/0010564 A1 | 1/2008 | Chrysanthakopoulos et al. | |
| 2008/0120605 A1* | 5/2008 | Rosen | 717/129 |
| 2008/0184196 A1* | 7/2008 | Kataoka | 717/107 |
| 2008/0196012 A1* | 8/2008 | Cohen et al. | 717/125 |
| 2008/0244325 A1* | 10/2008 | Tyulenev | 714/38 |
| 2009/0249307 A1* | 10/2009 | Yoshida | 717/131 |
| 2010/0083240 A1* | 4/2010 | Siman | 717/144 |
| 2011/0016457 A1* | 1/2011 | Artzi et al. | 717/131 |
| 2011/0029819 A1* | 2/2011 | Mehta et al. | 714/38 |

FOREIGN PATENT DOCUMENTS

WO     98/06019 A3     2/1998

OTHER PUBLICATIONS

Exception and Error Handling in Visual Basic. [online]. 2 pages. [retrieved on Jun. 4, 2009]. Retrieved from the Internet: < URL: http://msdn2.microsoft.com/en-us/library/s6da8809.aspx>.

(Continued)

*Primary Examiner* — Don Wong
*Assistant Examiner* — Daxin Wu
(74) *Attorney, Agent, or Firm* — Schmeiser, Olsen & Watts;; John Pivnichny

(57) ABSTRACT

A system and associated method for automatically correcting an application based on runtime behavior of the application. An incident indicates a performance of the application in which a problem object produces an outcome that had not been expected by a user or by a ticketing tool. An incident flow for the problem object is automatically analyzed. Actual run of the application renders a forward data flow and at least one backward data flow is simulated from an expected outcome of the problem object. The forward data flow and the backward data flow(s) are compared to create a candidate fault list for the problem object. A technical specification to correct the candidate fault list and a solution to replace the application are subsequently devised.

12 Claims, 12 Drawing Sheets

OTHER PUBLICATIONS

How to: Get Information about Visual Basic Compiler Errors. [online]. 2 pages. [retrieved on Jun. 4, 2009]. Retrieved from the Internet:< URL: http://msdn2.microsoft.com/en-us/library/shhwh397(VS.80).aspx>.

The Cost-centre Stack Profiling Tool. [online]. 1 page. [retrieved on Jun. 23, 2009]. Retrieved from the Internet:< URL: http://www.dcs.warwick.ac.uk/people/academic/Stephen.Jarvis/profiler/runtime-errors.html>.

Tool Mentor: Detecting Run-Time Errors Using Rational Purify(R) (Windows). [online]. 4 pages. [retrieved on Jun. 4, 2009]. Retrieved from the Internet:< URL: http://venus.imp.mx/hilario/personal/RUP2001.03.00.01/toolment/purify/tm_purfy.htm>.

Tutorials-Win.com>>XP Basic>>Runtime Errors—Microsoft Windows Forum. [online]. 10 pages. [retrieved on Jun. 9, 2009]. Retrieved from the Internet:< URL: http://www.tutorials-win.com/XPBasic/Runtime-errors/>.

Agrawal, H. et al. Debugging with Dynamic Slicing and Backtracking. Software Practice and Experience. John Wiley & Sons, Ltd. vol. 23, No. 6. Jun. 1993. pp. 589-616.

Beszedes, A. et al. Graph-Less Dynamic Dependence-Based Dynamic Slicing Algorithms. Proceedings of the Sixth IEEE International Workshop on Source Code Analysis and Manipulation (SCAM'06). Sep. 1, 2006. ISBN: 0-7695-2353-6/06. pp. 21-30.

Gallagher, K. et al. Program Slicing. Frontiers of Software Maintenance, FoSM 2008, IEEE. Piscataway, NJ, USA. Sep. 28, 2008. ISBN: 978-1-4244-2655-3/08. pp. 58-67.

Applicant: IBM's Reference No. IN090048. PCT International Application No. PCT/EP2010/062792. International Search Report and Written Opinion. EPO Date of Mailing: Nov. 18, 2010. 8 pages.

* cited by examiner

```
L1:   input: a, b, c;
L2:   d = a+10;
L3:   m = c*35+b;
L4:   g = d-50;
L5:   f = b+c;
L6:   h = f-a*10;
L7:   output: g, f, h;
```

AUTOMATIC CORRECTION OF APPLICATION BASED ON RUNTIME BEHAVIOR

BACKGROUND OF THE INVENTION

The present invention discloses a system and associated method for automated analysis and correction of program codes and/or data based on runtime behavior of a software application. Conventional debugging tools focus only on static structures and logics of software applications. To fix certain types of errors, the conventional debugging tools search knowledge based systems for similar errors and corresponding solutions. Because conventional debugging tools have limited functionalities in debugging runtime incidents of software applications, troubleshooting of software applications are labor-intensive and maintenance of software applications is costly.

BRIEF SUMMARY

According to one embodiment of the present invention, a method for automatically correcting an application based on runtime behavior of the application comprises: a processor of a computer receiving incident details of an incident of the application from a user or a ticketing tool, wherein said incident involves at least one problem object; identifying an incident flow of the incident from the incident details, wherein the incident flow corresponds to a first problem object of said at least one problem object, the incident flow comprising the first problem object, at least one assignment object that affects the first problem object within the application, and at least one code statement of the application in which said at least one assignment object affects the first problem object; creating a forward data flow of the incident flow by tracking data values of the incident flow that had been actually performed from the beginning of the application up to the incident with respect to the first problem object; creating at least one backward data flow of the incident flow by simulating said data values of the incident flow, in an order reverse to actual performance of the application, from an expected outcome of the first problem object to a respective initial value of said at least one assignment object for the first problem object; and said processor generating a candidate fault list of the first problem object of the incident by use of the forward data flow and said at least one backward data flow.

According to one embodiment of the present invention, a computer program product comprises a computer readable memory unit that embodies a computer readable program code. The computer readable program code contains instructions that, when run by a processor of a computer system, implement a method for automatically correcting an application based on runtime behavior of the application.

According to one embodiment of the present invention, a computer system comprises a processor and a computer readable memory unit coupled to the processor, wherein the computer readable memory unit containing instructions that, when run by the processor, implement a method for automatically correcting an application based on runtime behavior of the application.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for automatically correcting an application based on runtime behavior of the application.

DETAILED DESCRIPTION

Figure 1:
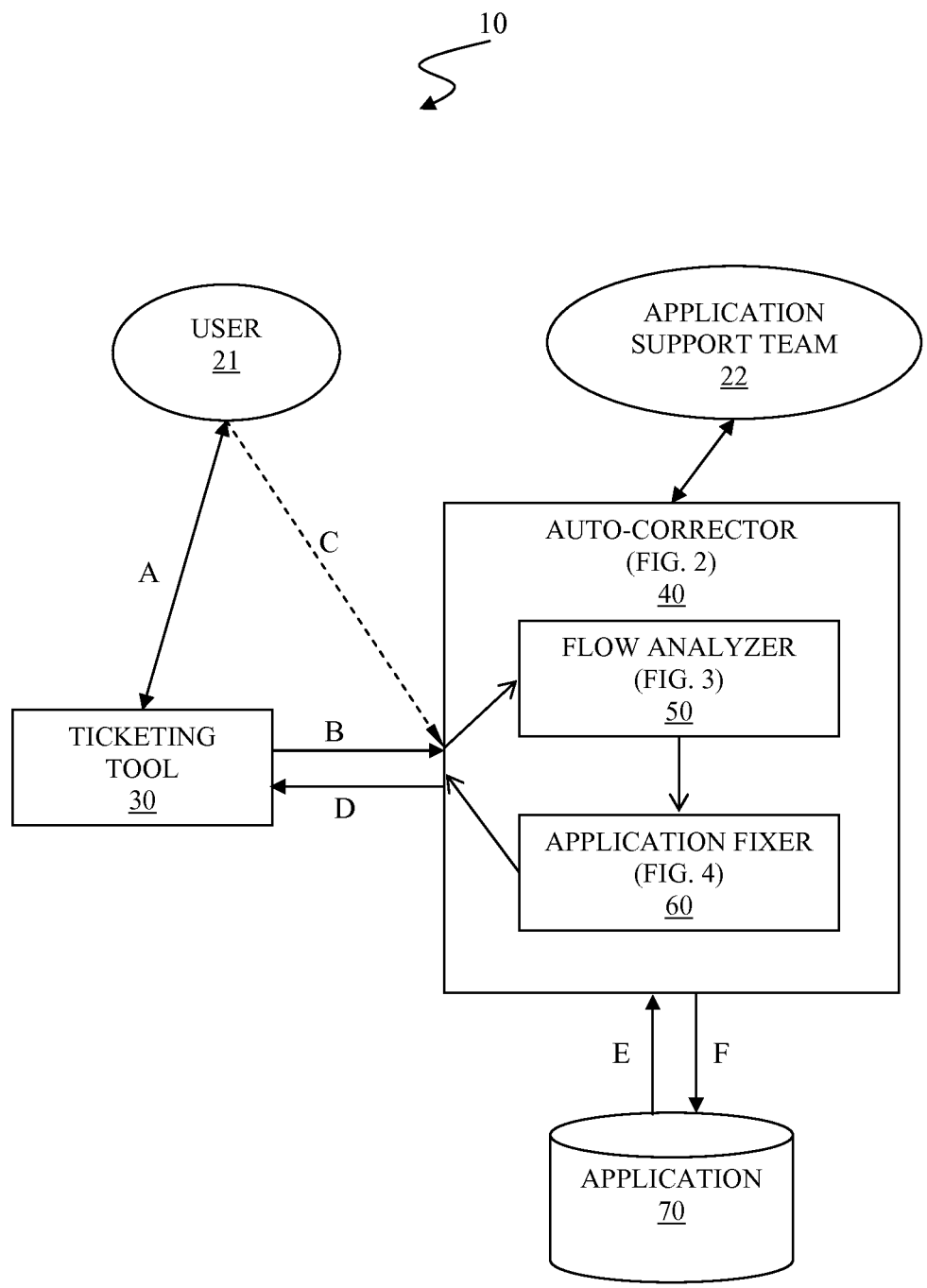
FIG. 1 illustrates a system 10 for automatically correcting an application based on runtime behavior of the application, in accordance with embodiments of the present invention.

FIG. 1 illustrates a system 10 for automatically correcting an application 70 based on runtime behavior of the application, in accordance with embodiments of the present invention.

The system 10 comprises a user 21, an application support team 22, a ticketing tool 30, an auto-corrector 40, and an application 70.

The user 21 provides inputs to the auto-corrector 40 and receives outputs generated by the auto-corrector 40. The user 21 provides the inputs by raising a ticket to the ticketing tool 30 as indicated by arrow A or by feeding the inputs directly to the auto-corrector 40 as indicated by arrow C. The ticket refers to a problem of the application 70. The ticketing tool 30 is a software tool that facilitates recording and status tracking of the ticket of software programs. The application 70 is a software program in which the problem had occurred. In this specification, the term "application" is defined as program codes and data for executing the application in its entirety.

The ticketing tool 30 provides inputs to the auto-corrector 40 from incident details provided by the user 21 as indicated by arrow B. Examples of conventional ticketing tools may be, inter alia, Radix, Remedy, Manage Now, Peregrine, etc.

The inputs to the auto-corrector 40 describe an incident. In this specification, the term "incident" is defined as any erroneous run of the application 70 producing a data value that had not been expected by the user 21. In this specification, the terms "incident" and "problem" are used interchangeably with the term "ticket." In this specification, the inputs are also referred to as the incident details. The incident may be, inter alia, a runtime error, a static error, a program error, a data error, etc. The inputs comprise code statements of the application 70 that had been performed and resulted in the incident, data environment in which the code statements produces the incident, an incorrect result generated by the incident, and a correct result expected by the user 21 in executing the code statements. In this specification, the term "data environment" is defined as a collection of data comprising user data, system configuration data, etc. that are used by the code statements.

The auto-corrector 40 receives the inputs describing the incident from the ticketing tool 30 and/or the user 21 and retrieves application details from the application 70. The application detail is indicated by arrow E. The application details comprise the code statements and the data environment of the application 70. The auto-corrector 40 utilizes the inputs and the application details to correct the application 70. The auto-corrector 40 comprises a flow analyzer 50 and an application fixer 60.

The flow analyzer 50 analyzes discrepancies between a forward flow and a backward flow of the application 70. The flow analyzer 50 comprises a first functional unit identifying an incident flow, a second functional unit tracking a forward data flow, a third functional unit tracking a backward data flow, and a fourth functional unit locating a candidate fault. See the descriptions of FIG. 3, infra, for details of the flow analyzer 50.

The application fixer 60 generates a solution that resolves the discrepancies between the forward flow and the backward flow of the application 70. The discrepancies are specified by an analysis result produced by the flow analyzer 50 or provided by the application support team 22. The application fixer 60 comprises a first functional unit generating a technical specification of the solution and a second functional unit generating the solution according to the technical specification. The application fixer 60 updates the application 70 with the solution as indicated by arrow F. The solution comprises new code statements and new data environment that are in formats that is used in place of the application 70 without producing the incident. The application fixer 60 also generates a resolution that documents the solution in text format and provides the resolution to the ticketing tool 30. The resolution is indicated by arrow D. See the descriptions of FIG. 4, infra, for details of the application fixer 60.

The application support team 22 interacts with the auto-corrector 40 by examining intermediate results while the auto-corrector 40 performs. Such intervention by the application support team 22 may be configured to be optional such that the auto-corrector 40 performs in a fully automated fashion.

The present invention automates analysis of an incident flow, a forward data flow and a backward data flow. The incident flow is a control flow causing a runtime incident when the application 70 runs. The forward data flow is a first data flow that had actually performed and resulted in the runtime incident. The backward data flow is a reverse data flow that is derived from an expected result free of the runtime incident. The present invention also automates identification and spotting of faults in the application 70, correction of the application 70, and updating of the application 70 for usage. Thus the present invention reduces the amount of effort and cost of conventional debugging processes.

Figure 2:
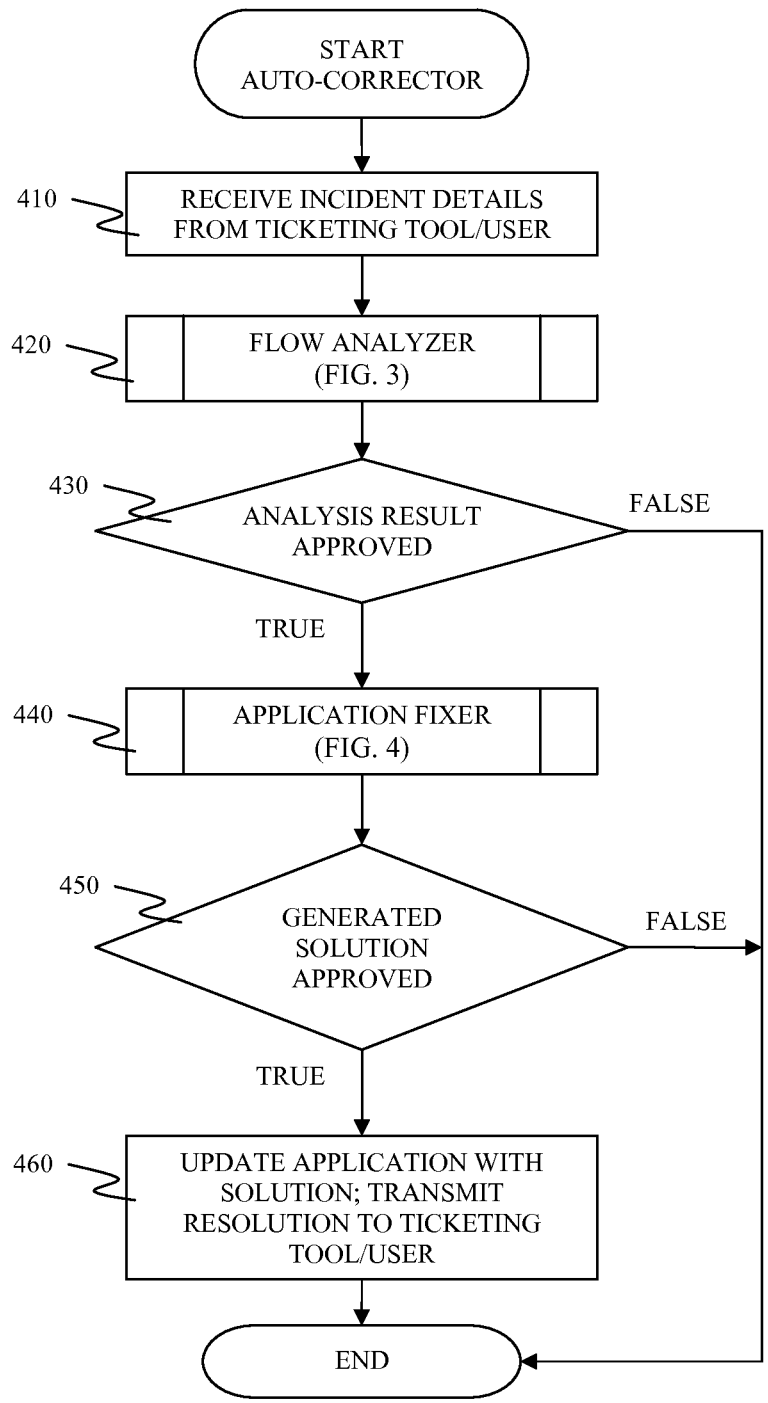
FIG. 2 is a flowchart depicting a method for automatically analyzing and correcting an application based on runtime behavior of the application as performed by an auto-corrector, in accordance with the embodiments of the present invention.

FIG. 2 is a flowchart depicting a method for automatically correcting an application based on runtime behavior of the application as performed by an auto-corrector, in accordance with the embodiments of the present invention.

In step 410, the auto-corrector receives incident details from the ticketing tool and/or the user. The incident details comprise code statements of the application that had been performed and resulted in the incident, data environment comprising user and system data values in which the code statements produces the incident, an incorrect result generated by the incident, and a correct result expected by the user 21 in executing the code statements of the application without the incident.

In step 420, the auto-corrector performs the flow analyzer that analyzes forward and backward control flow of the incident. See the flowchart of FIG. 3, infra, for details of the flow analyzer.

In step 430, the auto-corrector determines whether the analysis result produced by the flow analyzer is acceptable. The auto-corrector performs step 430, inter alia, by presenting the analysis result to the application support team and subsequently receiving an input from the application support team approving the analysis result, by applying the analysis result a predefined standard data set for the analysis result, by automatically determining to proceed with step 440 by an automation parameter configured for the auto-corrector, etc. If the auto-corrector determines that the analysis result produced by the flow analyzer is acceptable, then the auto-corrector proceeds with step 440. If the auto-corrector determines that the analysis result produced by the flow analyzer is not acceptable, then the auto-corrector terminates for manual analysis by a human programmer of the application support team.

In step 440, the auto-corrector performs the application fixer that corrects aspects of the application based on the result of the flow analyzer. See the flowchart of FIG. 4, infra, for details of the application fixer.

In step 450, the auto-corrector determines whether a solution that corrects the application as generated by the application fixer is acceptable. The auto-corrector performs step 450, inter alia, by presenting the solution to the application support team and subsequently receiving an input from the application support team approving the solution, etc. If the auto-corrector determines that the solution produced by the application fixer is acceptable, then the auto-corrector proceeds with step 460. If the auto-corrector determines that the solution produced by the application fixer is not acceptable, then the auto-corrector terminates for manual correction of the application by a human programmer of the application support team.

In step 460, the auto-corrector updates the application with the solution and transmits a resolution that documents details of the solution to the ticketing tool.

Figure 3:
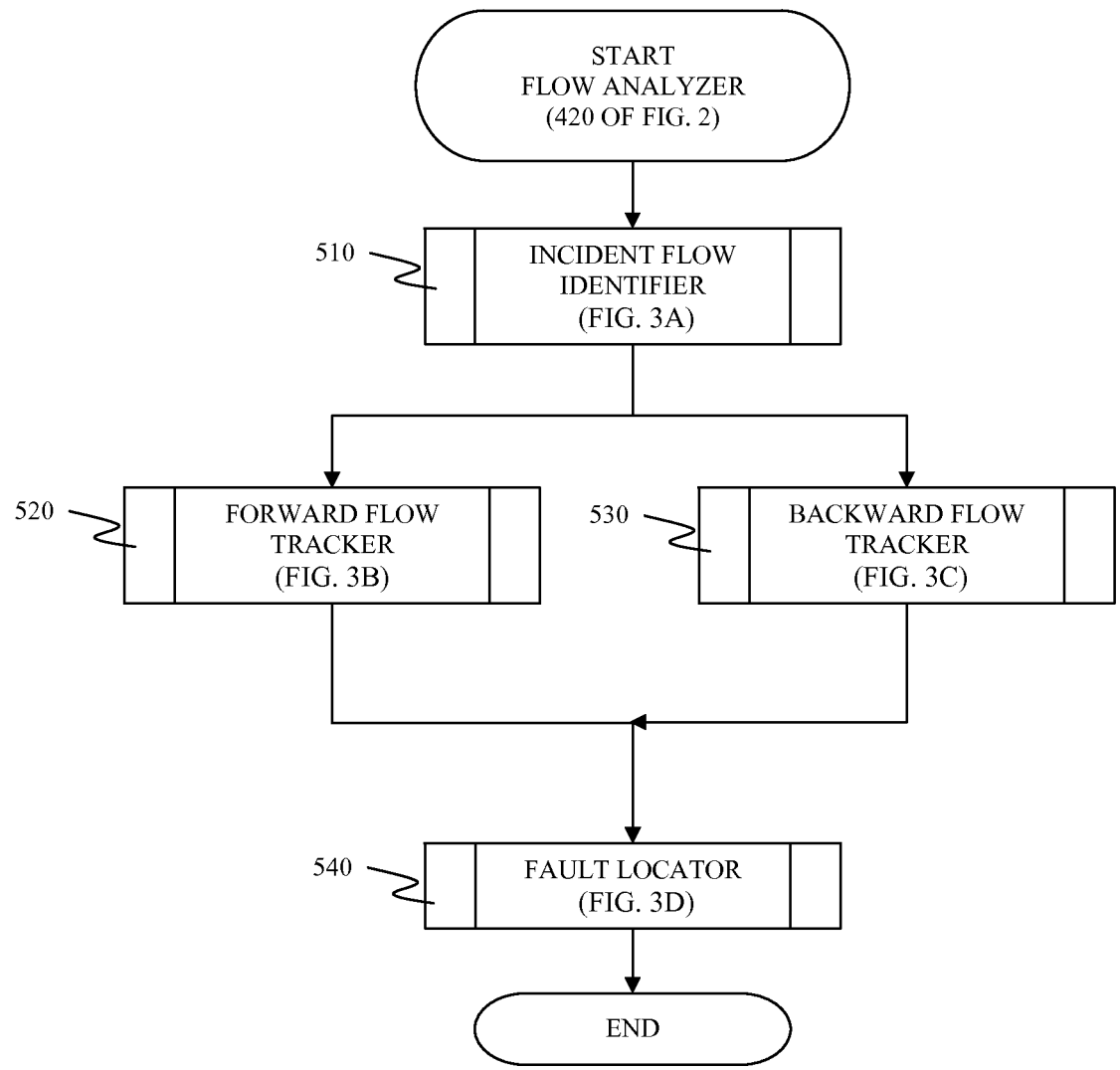
FIG. 3 is a flowchart depicting a method for automatically analyzing flows of the application as performed by a flow analyzer, wherein the flow analyzer is a first sub-module of the auto-corrector in FIG. 2, in accordance with the embodiments of the present invention.

FIG. 3 is a flowchart depicting a method for automatically analyzing flows of the application as performed by a flow analyzer, wherein the flow analyzer is a first sub-module of the auto-corrector in FIG. 2, supra, in accordance with the embodiments of the present invention.

In step 510, the flow analyzer performs an incident flow identifier that identifies a control flow of the incident. See descriptions of FIG. 3A, infra, for details of the incident flow identifier.

Steps 520 and 530 may be performed concurrently because step 520 and step 530 are independent. In step 520, the flow analyzer performs a forward flow tracker that tracks a forward data flow of the incident. See descriptions of FIG. 3B, infra, for details of the forward flow tracker.

In step 530, the flow analyzer performs a backward flow tracker that tracks a backward data flow of the incident. The backward data flow of the incident is a data flow that is reversely derived from an expected outcome value. See descriptions of FIG. 3C, infra, for details of the backward flow tracker.

In step 540, the flow analyzer performs a fault locator that generates a list of fault locations contributing to the incident with results from both step 520 and step 530. See descriptions of FIG. 3D, infra, for details of the fault locator.

Figure 3A:
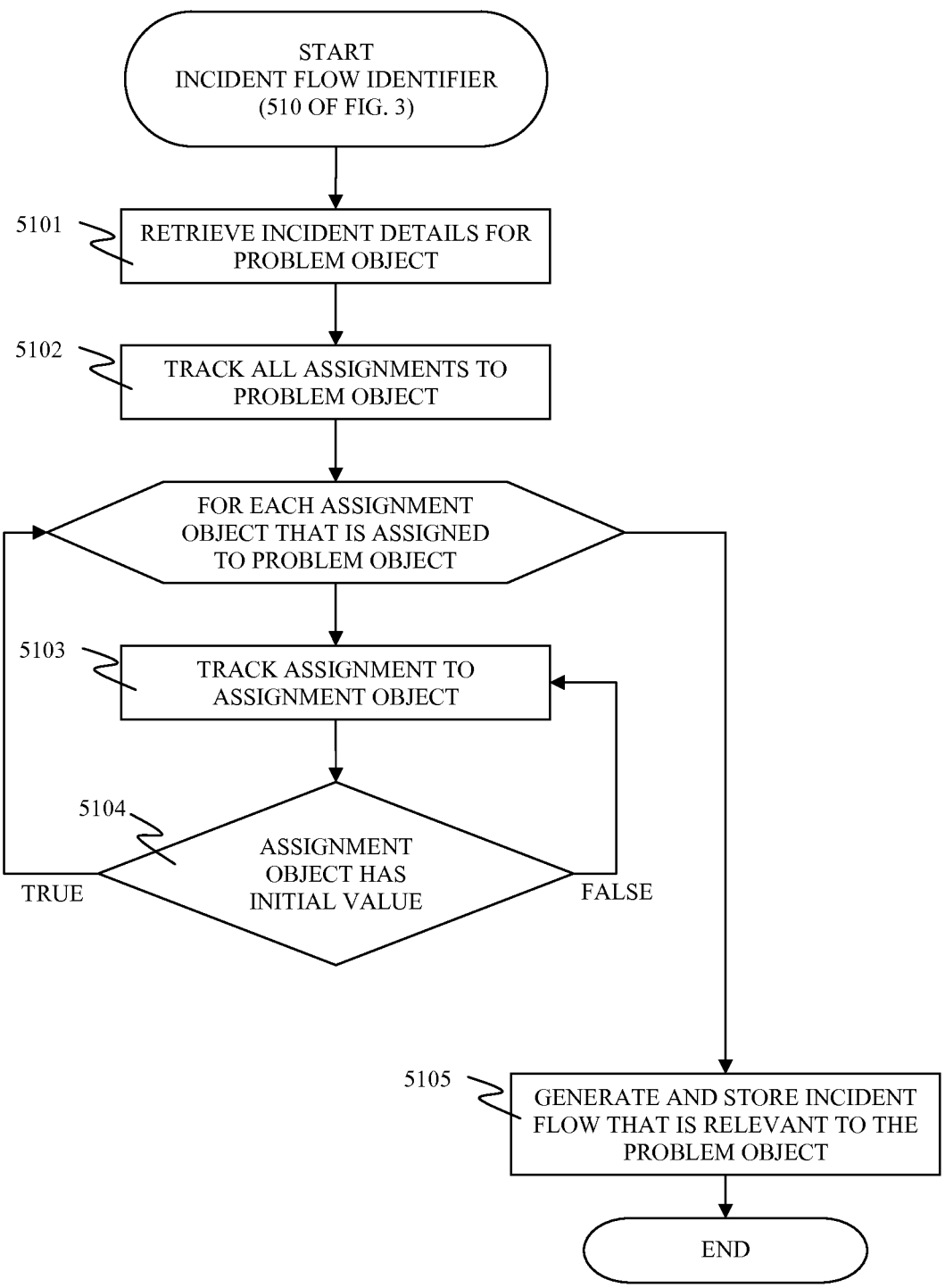
FIG. 3A is a flowchart depicting a method for automatically identifying a control flow of the application that results in an incident as performed by an incident flow identifier, wherein the incident flow identifier is a first sub-module of the flow analyzer in FIG. 3, in accordance with the embodiments of the present invention.

FIG. 3A is a flowchart depicting a method for automatically identifying a control flow of the application that results in an incident as performed by an incident flow identifier, wherein the incident flow identifier is a first sub-module of the flow analyzer in FIG. 3, supra, in accordance with the embodiments of the present invention.

In step 5101, the incident flow identifier retrieves incident details received in step 410 of FIG. 2, supra, for a problem object. The control flow of the application that results in the incident is referred to as an incident flow. In this specification, the term "problem object" indicates an object that has been reported to result in error by the ticketing tool via a ticket, and the term "assignment object" indicates an intermediate object that is directly or indirectly assigned to a specific problem object in the incident flow. The problem object and assignment objects are involved in the incident. If there is more than one problem object in the incident flow, then the incident flow identifier performs steps 5101 to 5105 for each problem object. The incident flow identifier proceeds with step 5102.

In step 5102, the incident flow identifier tracks all assignment statements to the problem object in code statements of the application. Because a value of the problem object is changed by an assignment statement, the incident flow comprises all of code statements assigning new value to the problem object. The incident flow identifier proceeds with step 5103.

For each assignment object that is assigned to the problem object in the all assignment statements, the incident flow identifier performs steps 5103 and 5104.

In step 5103, the incident flow identifier tracks an assignment to said assignment object. Because the assignment object changes the value of the problem object, the incident flow comprises code statements assigning new values to the assignment object. The incident flow identifier proceeds with step 5104.

In step 5104, the incident flow identifier determines whether said assignment object has an initial value by examining a code statement of the application. The assignment object has the initial value wherein the code statement receives an input from a user or wherein the assignment object has a value equal to value when the application begins. If the incident flow identifier determines that the assignment object does not have the initial value, then the incident flow identifier performs 5103 for a next assignment for the assignment object. If the incident flow identifier determines that the assignment object has the initial value, then the incident flow identifier loops back to step 5103 to process another assignment object assigned to the problem object. When all assignment objects that are assigned to the problem object reach respective initial values, the incident flow identifier proceeds with step 5105.

In step 5105, the incident flow identifier generates and stores the incident flow that describes all problem objects involved in the incident, all assignment objects assigned to respective problem objects, all initial values of respective assignment objects, and respective sequence of values that have been changed for each problem object. After performing step 5105, the incident flow identifier passes control to the auto-corrector. See FIG. 5A, infra, for an example of the incident flow.

Figure 3B:
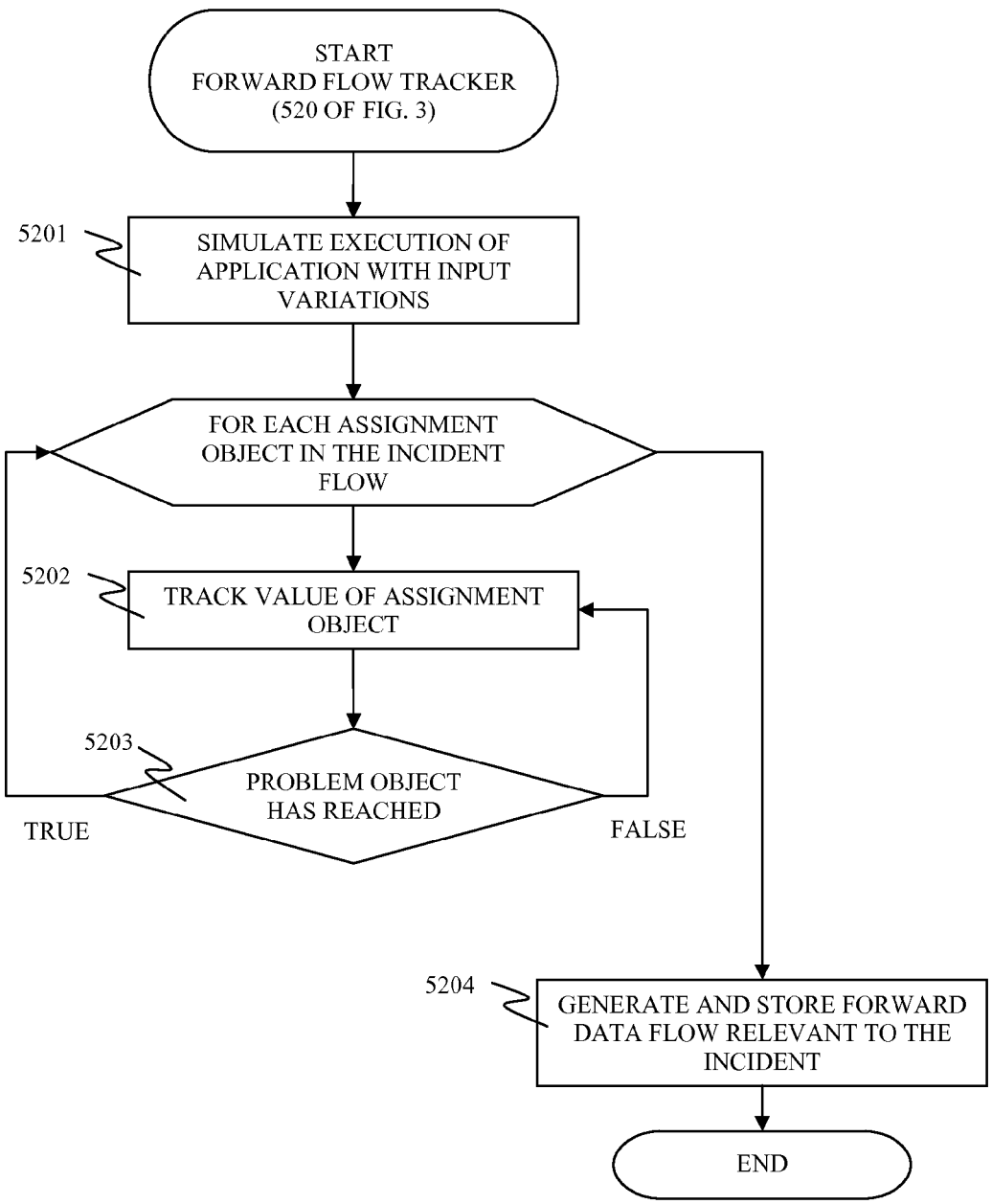
FIG. 3B is a flowchart depicting a method for automatically tracking a forward data flow of the application that results in the incident as performed by a forward flow tracker, wherein the forward flow tracker is a second sub-module of the flow analyzer in FIG. 3, in accordance with the embodiments of the present invention.

FIG. 3B is a flowchart depicting a method for automatically tracking a forward data flow of the application that results in the incident as performed by a forward flow tracker, wherein the forward flow tracker is a second sub-module of the flow analyzer in FIG. 3, supra, in accordance with the embodiments of the present invention.

In step 5201, the forward flow tracker simulates computations of the application by running the incident flow with at least one input variation for a problem object. Said at least one input variation is automatically generated based on a user input for the problem object. The forward flow tracker proceeds with step 5202.

For each assignment object in the incident flow, the forward flow tracker performs steps 5202 and 5203.

In step 5202, the forward flow tracker tracks a value of a current assignment object. The forward flow tracker proceeds with step 5203.

In step 5203, the forward flow tracker determines whether the current assignment object has reached to the problem object by comparing respective values of the problem object and the current assignment object within the incident flow. If the forward flow tracker determines that the current assignment object has not reached to the problem object yet, then the forward flow tracker performs step 5202 for an immediately subsequent assignment for the current assignment object within program codes of the application. If the forward flow tracker determines that the current assignment object has reached to the problem object, then the forward flow tracker loops back to step 5202 to process another assignment object assigned to the problem object. When the forward flow tracker determines that all assignment objects in the incident flow of the problem object reach the problem object, the forward flow tracker proceeds with step 5204.

In step 5204, the forward flow tracker generates and stores the forward data flow relevant to the incident. The forward data flow illustrates an actual run of the application that had resulted in the incident.

Figure 3C:
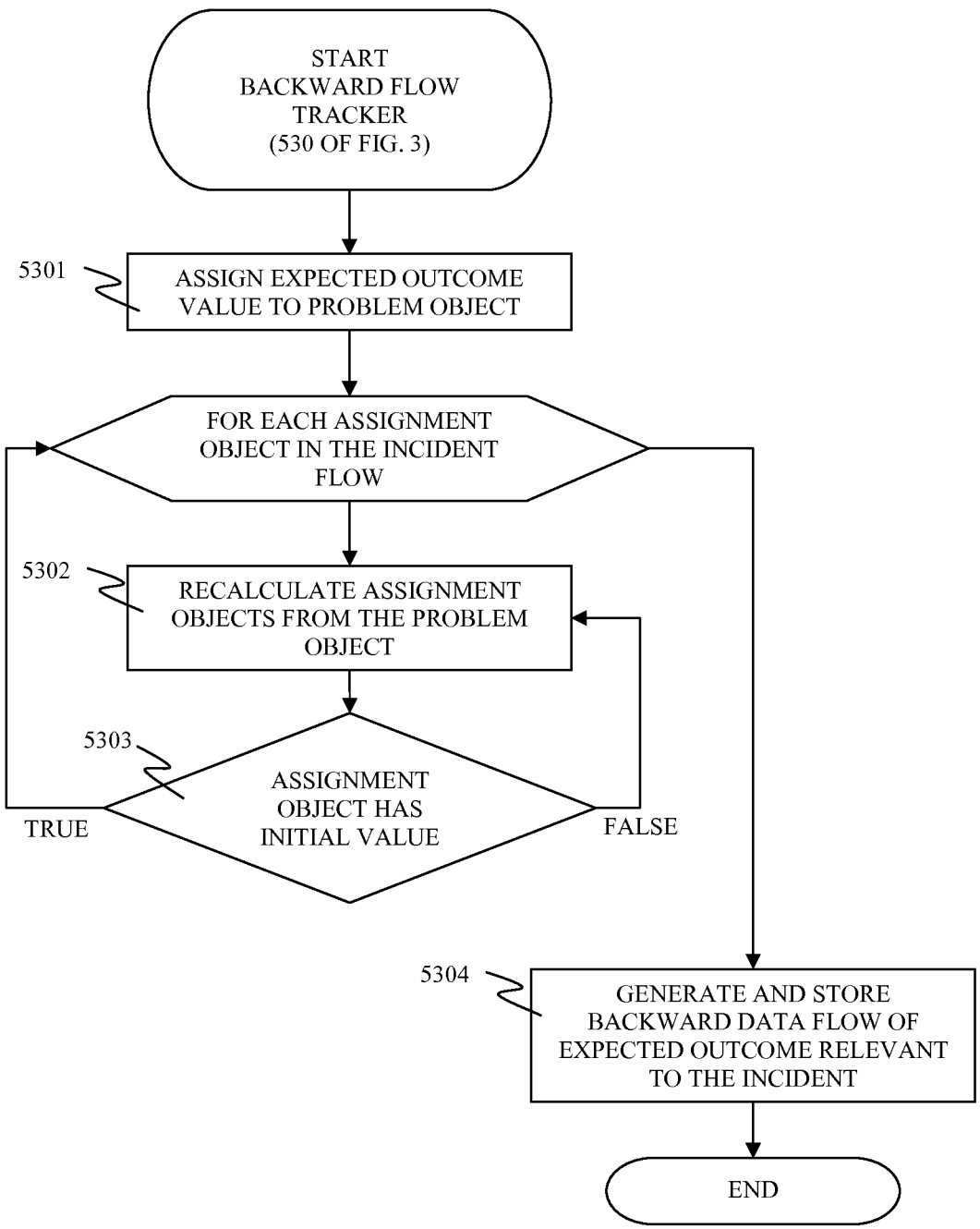
FIG. 3C is a flowchart depicting a method for automatically tracking a backward data flow of the application that is reversely derived from an expected outcome value as performed by a backward flow tracker, wherein the backward flow tracker is a third sub-module of the flow analyzer in FIG. 3, in accordance with the embodiments of the present invention.

FIG. 3C is a flowchart depicting a method for automatically tracking a backward data flow of the application that is reversely derived from an expected outcome value as performed by a backward flow tracker, wherein the backward flow tracker is a third sub-module of the flow analyzer in FIG. 3, supra, in accordance with the embodiments of the present invention.

In step 5301, the backward flow tracker assigns the expected outcome value to the problem object. The expected outcome value is provided by the user to the auto-corrector as an input. The backward flow tracker proceeds with step 5302.

For each assignment object in the incident flow, the backward flow tracker performs steps 5302 and 5303.

In step 5302, the backward flow tracker recalculates a current assignment object from the problem object. The backward flow tracker proceeds with step 5303.

In step 5303, the backward flow tracker determines whether the current assignment object has an initial value by comparing respective values of the current assignment object and a user input for the current assignment object or by determining that the incident flow is at the beginning of the application. If the backward flow tracker determines that the current assignment object does not have the initial value, then the backward flow tracker performs step 5302 for an immediately previous assignment of the application for the current assignment object within program codes of the application. If the backward flow tracker determines that the current assignment object has the initial value, then the backward flow tracker loops back to step 5302 to process another assignment object assigned to the problem object. When the backward flow tracker determines that all assignment objects in the incident flow of the problem object have respective initial values, the backward flow tracker proceeds with step 5304.

In step 5304, the backward flow tracker generates and stores at least one backward data flow derived from expected outcome value of the problem object relevant to the incident. Each backward data flow of said at least one backward data flow identifies a set of data values and respective code statements in which respective data values are assigned. The data values comprise user data and system configuration data. Said each backward data flow illustrates a simulated run of the application to produce the expected outcome values of the problem object wherein the application runs without the incident.

Steps 5301 to 5304 are repeated for each problem object relevant to the incident.

Figure 3D:
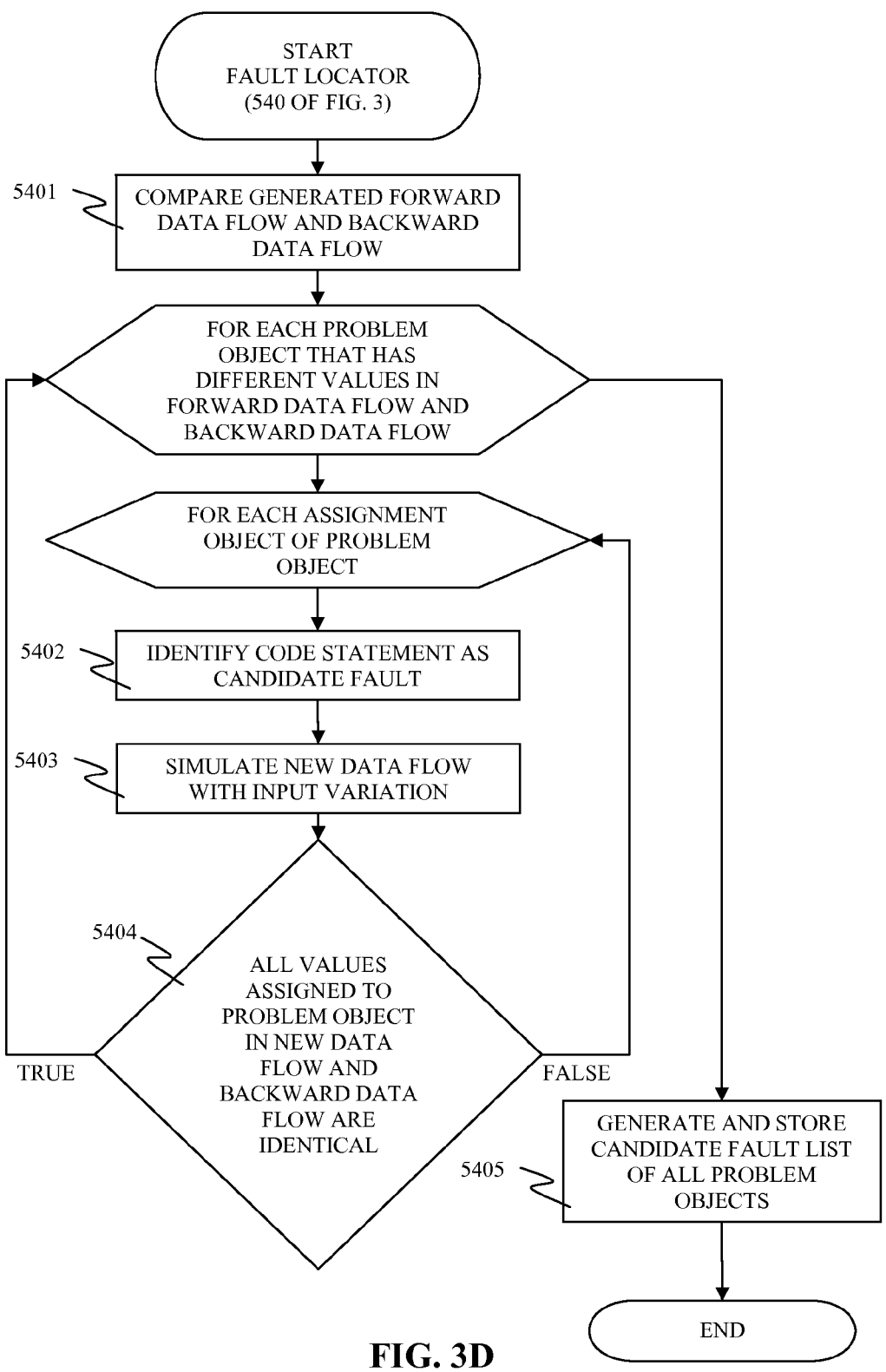
FIG. 3D is a flowchart depicting a method for automatically locating faults of the application as performed by a fault locator, wherein the fault locator is a fourth sub-module of the flow analyzer in FIG. 3, in accordance with the embodiments of the present invention.

FIG. 3D is a flowchart depicting a method for automatically locating faults of the application as performed by a fault locator, wherein the fault locator is a fourth sub-module of the flow analyzer in FIG. 3, supra, in accordance with the embodiments of the present invention.

In step 5401, the fault locator compares the forward data flow generated by the forward flow tracker for each of the problem objects and the corresponding at least one backward data flow generated by the backward flow tracker for each of the problem objects according to the descriptions of FIGS. 3B and 3C, supra, respectively. The fault locator proceeds with step 5402.

The fault locator performs steps 5402 through 5404 for respective assignment object of each problem object. As noted supra, each problem object is an object that has been reported to result in error by the ticketing tool via a ticket, and at least one assignment object is associated with said each problem object by respective assignment within the incident flow.

In step 5402, the fault locator identifies a candidate fault. The candidate fault is selected from the group consisting of an assignment statement in which an assignment object has different values in the forward data flow and in the backward data flow, a decision statement wherein an actual path taken by the forward data flow is not identical to an expected path simulated in the backward data flow, and combinations thereof. The fault locator proceeds with step 5403.

In step 5403, the fault locator simulates at least one new data flow with a respective input variation. An input variation is generated for a new data flow to resemble the backward data flow simulating a run of the application that produces the expected outcome value. The fault locator creates the new data flow by running the application with the generated input variation. The fault locator proceeds with step 5404.

In step 5404, the fault locator determines whether respective values assigned to a current problem object in the new data flow and in the backward data flow are identical. If the fault locator determines that respective values assigned to the current assignment object in the new data flow and in the backward data flow are different, then the fault locator performs step 5403 for another input variation for a current assignment object. If the fault locator determines that respective values assigned to the current assignment object in the new data flow and in the backward data flow are identical, then the fault locator loops back to step 5402 to process another problem object that has different values in the forward data flow and the backward data flow. Upon completion of processing all problem objects and control statements that has different values in the forward data flow and the backward data flow, the fault locator proceeds with step 5405.

In step 5405, the fault locator generates and stores a candidate fault list that comprises all candidate faults identified for all problem objects in the incident and data values of respective assignment objects that are associated with a respective candidate fault.

Figure 4:
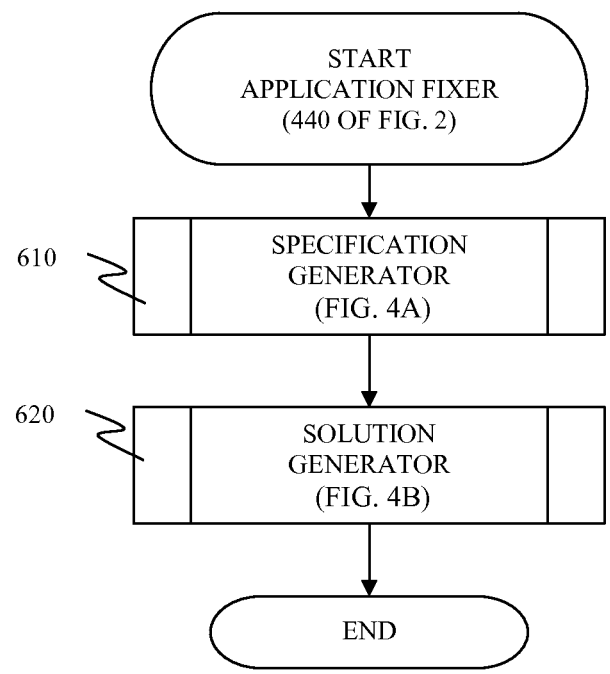
FIG. 4 is a flowchart depicting a method for automatically correcting faults of the application as performed by an application fixer, wherein the application fixer is a second sub-module of the auto-corrector in FIG. 2, in accordance with the embodiments of the present invention.

FIG. 4 is a flowchart depicting a method for automatically correcting faults of the application as performed by an application fixer, wherein the application fixer is a second sub-module of the auto-corrector in FIG. 2, supra, in accordance with the embodiments of the present invention.

In step 610, the application fixer performs a specification generator that generates a technical specification of a solution. The solution is a corrected application that runs without the incident. See descriptions of FIG. 4A, infra, for details of the specification generator.

In step 620, the application fixer performs a solution generator that generates the solution and a resolution that documents the solution for the ticketing tool and/or the user. See descriptions of FIG. 4B, infra, for details of the solution generator.

Figure 4A:
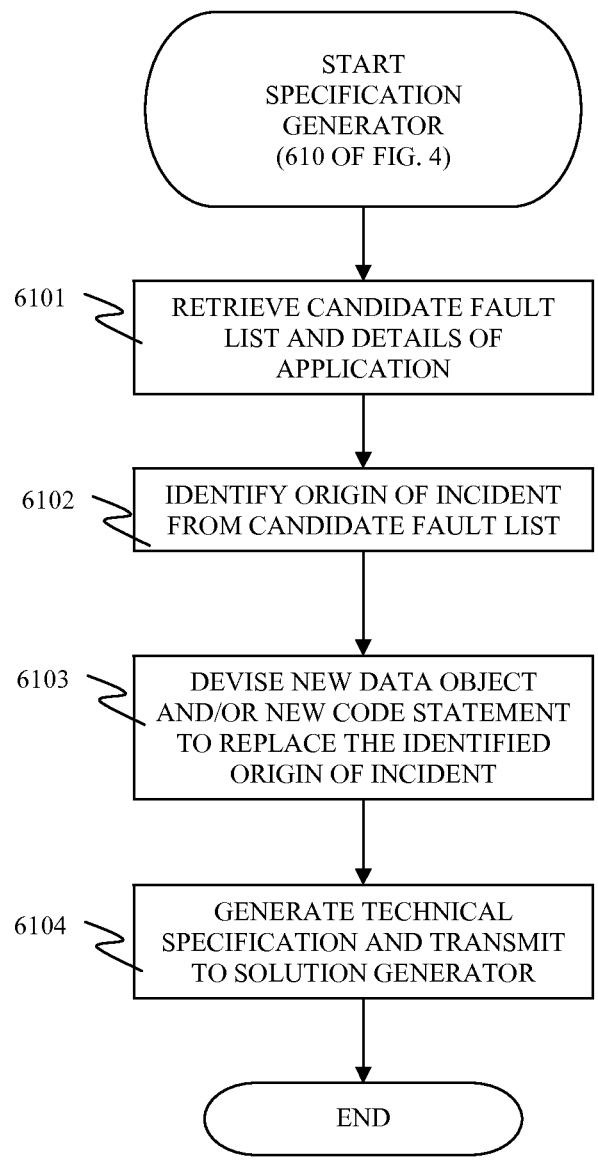
FIG. 4A is a flowchart depicting a method for automatically generating a technical specification for a solution as performed by a specification generator, wherein the specification generator is a first sub-module of the application fixer in FIG. 4, in accordance with the embodiments of the present invention.

FIG. 4A is a flowchart depicting a method for automatically generating a technical specification for a solution as performed by a specification generator, wherein the specification generator is a first sub-module of the application fixer in FIG. 4, supra, in accordance with the embodiments of the present invention.

In step 6101, the specification generator retrieves the candidate fault list generated by the fault locator of the flow analyzer and details of the application. The details of the application are made available through the auto-corrector.

In step 6102, the specification generator identifies an origin of the incident by examining the candidate fault list and the details of the application. The origin of the incident may be, inter alia, a data object, a code statement in the application, and combinations thereof.

In step 6103, the specification generator devises a new data object and/or a new code statement to replace the identified origin of the incident based on data values in the backward data flow.

In step 6104, the specification generator generates a technical specification of the solution that is a corrected application that runs without the incident and produces an outcome expected by the user. The specification generator then transmits the technical specification to a solution generator of the application fixer.

Figure 4B:
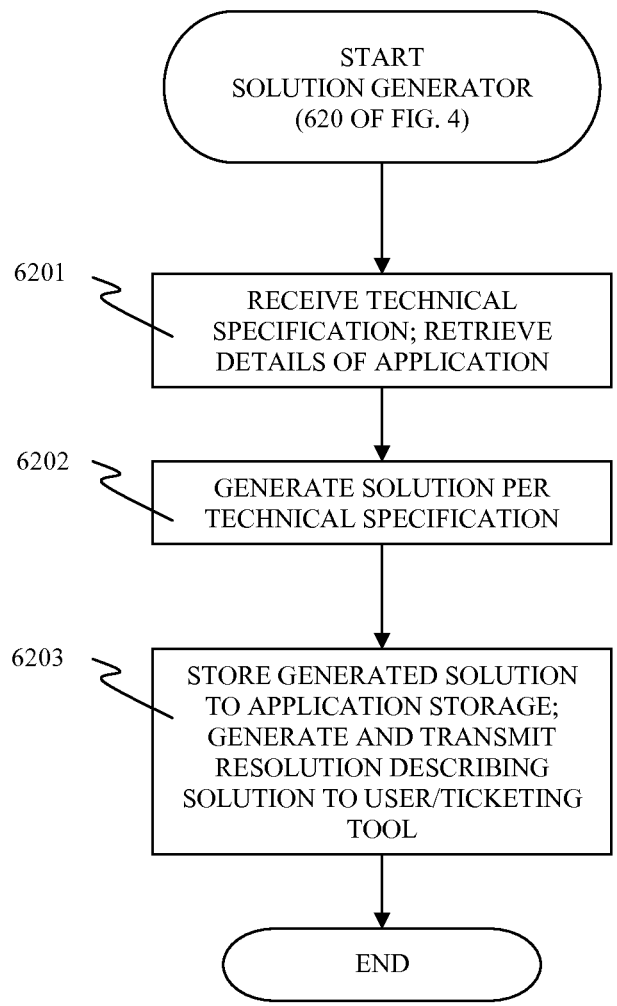
FIG. 4B is a flowchart depicting a method for automatically generating a solution pursuant to a technical specification as performed by a solution generator, wherein the solution generator is a second sub-module of the application fixer in FIG. 4, in accordance with the embodiments of the present invention.

FIG. 4B is a flowchart depicting a method for automatically generating a solution pursuant to a technical specification as performed by a solution generator, wherein the solution generator is a second sub-module of the application fixer in FIG. 4, supra, in accordance with the embodiments of the present invention.

In step 6201, the solution generator receives the technical specification from the specification generator and retrieves details of the application. The details of the application are made available through the auto-corrector.

In step 6202, the solution generator generates the solution that corrects the application of the incident pursuant to the technical specification. The solution is a new application that generates an expected result without the incident. The solution is selected from the group consisting of a code statement, a configuration parameter, a user data, and combinations thereof. The code statement of the solution replaces an existing code statement of the application to correct the incident. The configuration parameter of the solution changes runtime environments of the application to correct the incident. The user data of the solution enables the application to run with a new set of data that is different from a set of data that resulted in the incident.

In step 6203, the solution generator stores the generated solution to a storage for the application. The solution generator also generates a resolution that documents the solution as a textual description. The solution generator transmits the resolution to the user and/or the ticketing tool.

In one embodiment of the present invention, the application is a program called "myprogram" which comprises a statement "x=4" which is determined to be corrected. The solution for the statement "x=4" is a statement "x=5" that replaces the statement "x=4" within the application myprogram. A resolution is a textual description of the solution such as, inter alia, "the problem was caused due to a fault in the program "myprogram" where in on line z the variable x was checked against value 4 whereas it should be checked against value 5".

Figures 5A, 5B:
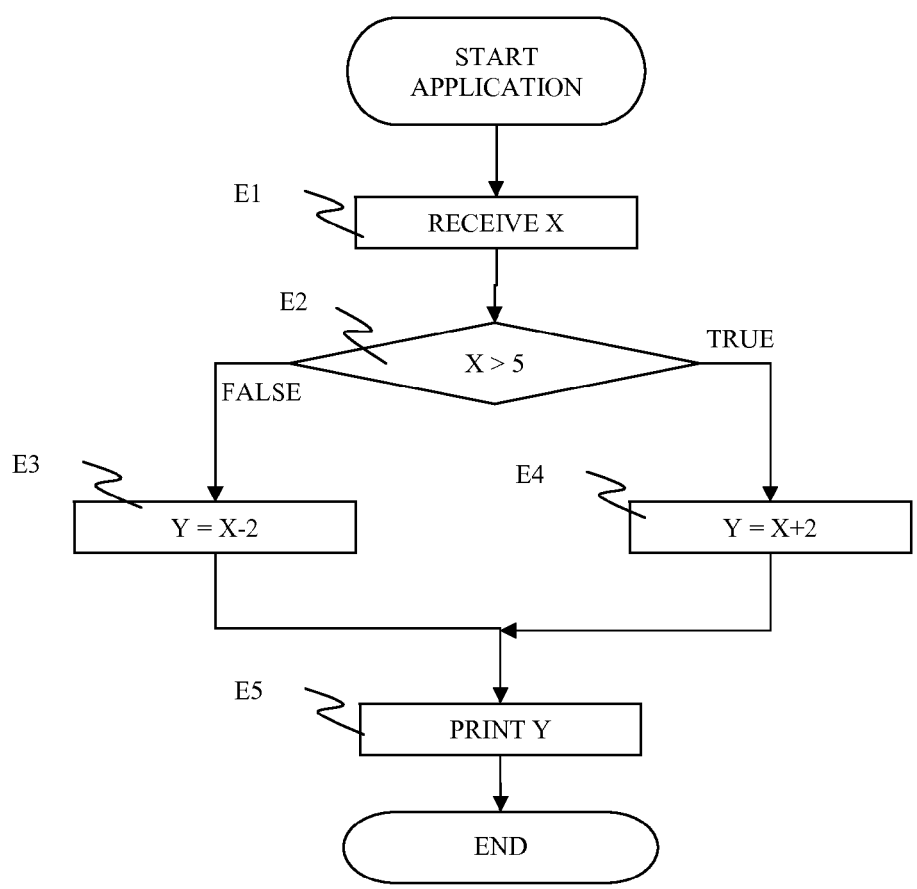
FIG. 5A illustrates a pseudo code of an application upon which the auto-corrector performs the method of FIG. 2, in accordance with the embodiments of the present invention.
FIG. 5B illustrates a flowchart of an application upon which the auto-corrector performs the method of FIG. 2, in accordance with the embodiments of the present invention.

FIG. 5A illustrates a pseudo code of an application upon which the auto-corrector performs the method of FIG. 2, supra, in accordance with the embodiments of the present invention.

The incident flow identifier, in step 5101 of FIG. 3A, supra, retrieves incident details that identifies a problem object as parameter g. The incident flow identifier, in step 5102 of FIG. 3A, supra, tracks assignment statements to the problem object g. Because the problem object g is assigned from parameter d in line L4 "g=d−50;", parameter d is a first assignment object of the problem object g. The incident flow identifier, in step 5103 of FIG. 3A, supra, tracks parameter a as a second assignment object of the problem object parameter g because parameter d is assigned from parameter a in line L2 "d=a+10;". The incident flow identifier, in step 5104 of FIG. 3A, supra, determines that parameter a has an initial value because parameter a is an input parameter that is initialized by a user input and terminates tracking assignment objects. The incident flow identifier proceeds with step 5105 of FIG. 3A, supra, and generates an incident flow of the problem object parameter g as lines L2 and L4 and parameters a, d, and g.

FIG. 5B illustrates a flowchart of an application upon which the auto-corrector performs the method of FIG. 2, supra, in accordance with the embodiments of the present invention.

A user raises a ticket that describes a problem of the application that when a user input for variable X is 4, the application prints 2 as a value of variable Y wherein the user expected the value of variable Y to be 6.

The forward flow tracker discovers a forward data flow that had been actually performed is steps E1-E2-E3-E5.

The backward flow tracker simulates a run by instantiating variable Y with the expected value of variable Y 6 in step E5. Wherein the backward flow tracker tries step E3, a simulated value for variable X is 8, which contradicts a decision made in step E2 because 8 is greater than 5. Also because the user input for variable X is 4, a simulated run comprising E3 is incorrect.

Wherein the backward flow tracker tries step E4, a simulated value for variable X is 4, which also contradicts a decision made in step E2 because 4 is less than 5. Because of step E2, the application cannot generate the expected value 6 of variable Y from the input 4 for variable X. The fault locator compares the forward data flow and the backward data flow and identifies step E2 as a candidate fault.

The specification generator devises "X>3" for step E2 to correct the application and generates a technical specification for a new application having "X>3" in place of step E2. The solution generator creates a new application having "X>3" in place of step E2 as a solution and creates a resolution describe the solution in text.

Figure 6:
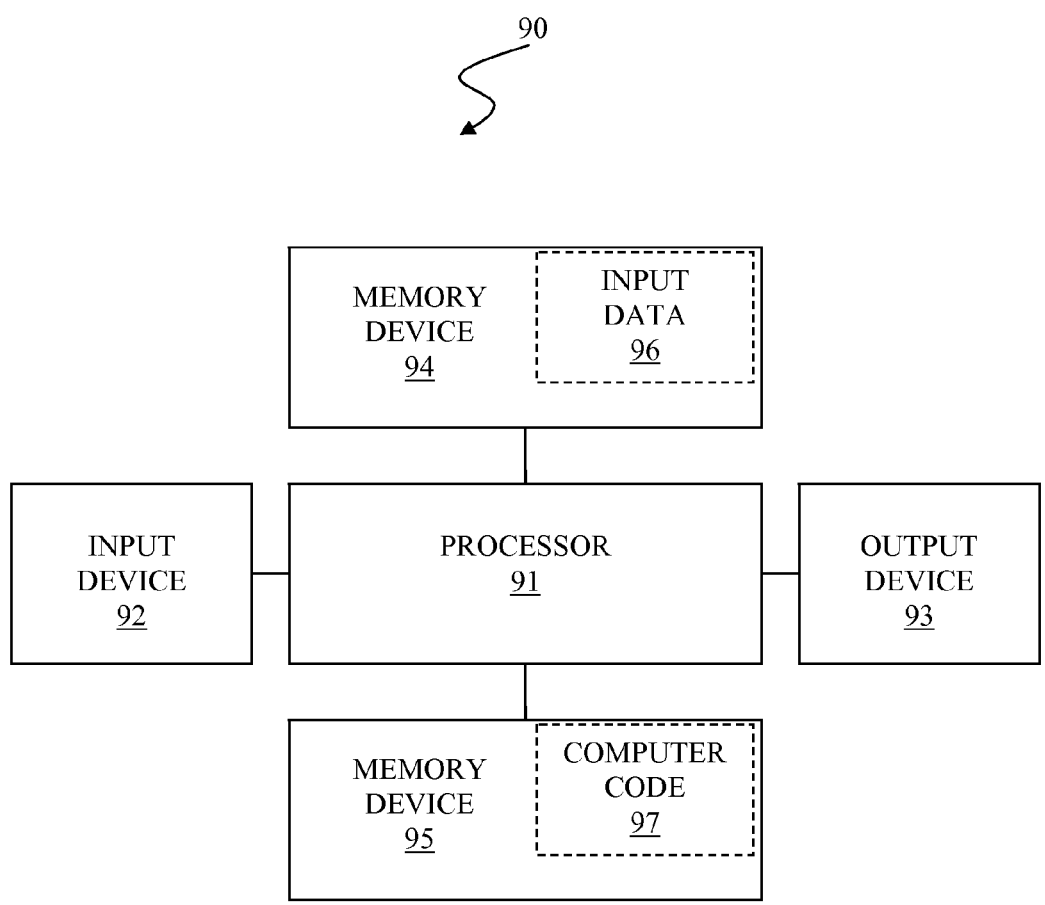
FIG. 6 illustrates a computer system used for automatically correcting an application based on runtime behavior of the application, in accordance with the embodiments of the present invention.

FIG. 6 illustrates a computer system used for automatically correcting an application based on runtime behavior of the application, in accordance with the embodiments of the present invention.

The computer system 90 comprises a processor 91, an input device 92 coupled to the processor 91, an output device 93 coupled to the processor 91, and computer readable memory units comprising memory devices 94 and 95 each coupled to the processor 91. The input device 92 may be, inter alia, a keyboard, a mouse, a keypad, a touch screen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program code that comprises computer-executable instructions. The computer code 97 includes, inter alia, an algorithm used for automatically correcting an application based on runtime behavior of the application according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may be used as a computer readable storage medium (or a computer usable storage medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer readable storage medium (or said program storage device).

Any of the components of the present invention can be deployed, managed, serviced, etc. by a service provider that offers to deploy or integrate computing infrastructure with respect to a process for dynamically building a web interface per data collecting rules of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for automatically correcting an application based on runtime behavior of the application.

In another embodiment, the invention provides a business method that performs the process steps of the invention on a subscription, advertising and/or fee basis. That is, a service provider, such as a Solution Integrator, can offer to create, maintain, support, etc. a process for automatically correcting an application based on runtime behavior of the application of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) 94, 95 may be utilized. The term computer usable medium or computer readable medium collectively refers to computer usable/readable storage medium 94, 95. The computer-usable or computer-readable medium 94, 95 may be, for example but not limited to, an electronic, magnetic, optical, electromagnetic, infrared, or semiconductor system, apparatus, a device, or any suitable combination of the foregoing. More specific examples (a non-exhaustive list) of the computer-readable medium 94, 95 would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-usable or computer-readable medium 94, 95 could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium 94, 95 may be any medium that can contain, or store a program for use by or in connection with a system, apparatus, or device that executes instructions.

Computer code 97 for carrying out operations of the present invention may be written in any combination of one or more programming languages, including an object oriented programming language such as Java, Smalltalk, C++ or the like and conventional procedural programming languages, such as the "C" programming language or similar programming languages. The computer code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer code 97" in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in the computer-readable medium 94, 95 that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for automatically correcting an application based on runtime behavior of the application, said method comprising:

receiving, by a processor of a computer system, incident details of an incident of the application from a first user or a ticketing tool, wherein the incident is an erroneous run of the application in which an incorrect data value of a first problem object of at least one problem object was determined such that the incorrect data value had not been expected by the first user and differs from a correct data value of the first problem object that had been expected by the first user;

said processor receiving an initial input value for a first assignment object;

after said receiving the initial input value for the first assignment object, said processor identifying and storing from the incident details an incident flow comprising the first problem object, at least one assignment object that affects the first problem object within the application, and a set of code statements of the application in which the at least one assignment object affects the first problem object, said at least one assignment object comprising the first assignment object;

said processor creating and storing a forward data flow of the incident flow by tracking data values of the incident flow of at least one code statement that had been actually performed from the beginning of the application up to the incident with respect to the first problem object;

said processor creating and storing at least one backward data flow of the incident flow by simulating the data values of the incident flow, in an order reverse to actual performance of the application, from the correct data value of the first problem object to the initial input value for the first assignment object;

said processor generating and storing a candidate fault list of the first problem object of the incident by use of the forward data flow and the at least one backward data flow;

said processor prompting a second user to examine the forward data flow, said at least one backward data flow and the candidate fault list and receiving a first input from the second user, wherein the first input indicates that the second user approves the generated candidate fault list based on the forward data flow and said at least one backward data flow, and wherein the second user is authorized to update the application;

responsive to receiving the first input from the second user, said processor generating a technical specification that corrects the incident of the application by use of the candidate fault list and a specification of the application;

said processor generating a solution according to the technical specification and generating a resolution that describes the solution for the first user or the ticketing tool;

said processor presenting to the second user the solution and receiving a second input from the second user, wherein the second input indicates that the second user approves the solution; and responsive to receiving the second input from the second user, said processor updating the application with the solution such that the application runs free of the incident and communicating the resolution to the first user or the ticketing tool;

said generating the technical specification comprising:
retrieving at least one candidate fault list including the candidate fault list of the first problem object and retrieving the specification of the application;
identifying an origin of the incident from said at least one candidate fault list;
devising a replacement for the origin, wherein the replacement is selected from the group consisting of a new data object, a new code statement, and a combination thereof; and
adding the origin and the replacement in the technical specification for the incident.

2. The method of claim 1, said creating said at least one backward data flow comprising:

assigning the correct data value of the first problem object to the first problem object in a last code statement of said at least one code statement in the incident flow;

recalculating said at least one assignment object from the correct data value of the first problem object;

determining that said first assignment object has the initial input value; and generating a first backward data flow of said at least one backward data flow for the first problem object.

3. The method of claim 2, said generating the candidate fault list comprising:

identifying a first code statement of the at least one code statement as a first candidate fault;

simulating a new data flow by applying a different set of input values for said at least one assignment object;

determining that respective values of the new data flow and the first backward data flow are identical; and adding the first candidate fault in the candidate fault list of the first problem object.

4. A computer program product comprising:

a computer readable memory having a computer readable program code stored therein, said computer readable program code containing instructions configured to be executed by a processor of a computer system to implement a method for automatically correcting an application based on runtime behavior of the application, said method comprising:

said processor receiving incident details of an incident of the application from a first user or a ticketing tool, wherein the incident is an erroneous run of the application in which an incorrect data value of a first problem object of at least one problem object was determined such that the incorrect data value had not been expected by the first user and differs from a correct data value of the first problem object that had been expected by the first user;

said processor receiving an initial input value for a first assignment object;

after said receiving the initial input value for the first assignment object, said processor identifying and storing from the incident details an incident flow comprising the first problem object, at least one assignment object that affects the first problem object within the application, and a set of code statements of the application in which the at least one assignment object affects the first problem object, said at least one assignment object comprising the first assignment object;

said processor creating and storing a forward data flow of the incident flow by tracking data values of the incident flow of at least one code statement that had been actually performed from the beginning of the application up to the incident with respect to the first problem object;

said processor creating and storing at least one backward data flow of the incident flow by simulating the data values of the incident flow, in an order reverse to actual performance of the application, from the correct data value of the first problem object to the initial input value for the first assignment object;

said processor generating and storing a candidate fault list of the first problem object of the incident by use of the forward data flow and the at least one backward data flow;

said processor prompting a second user to examine the forward data flow, said at least one backward data flow and the candidate fault list and receiving a first input from the second user, wherein the first input indicates that the second user approves the generated candidate fault list based on the forward data flow and said at least one backward data flow, and wherein the second user is authorized to update the application;

responsive to receiving the first input from the second user, said processor generating a technical specification that corrects the incident of the application by use of the candidate fault list and a specification of the application;

said processor generating a solution according to the technical specification and generating a resolution that describes the solution for the first user or the ticketing tool;

said processor presenting to the second user the solution and receiving a second input from the second user, wherein the second input indicates that the second user approves the solution; and responsive to receiving the second input from the second user, said processor updating the application with the solution such that the application runs free of the incident and communicating the resolution to the first user or the ticketing tool;

said generating the technical specification comprising:
retrieving at least one candidate fault list including the candidate fault list of the first problem object and retrieving the specification of the application;
identifying an origin of the incident from said at least one candidate fault list;
devising a replacement for the origin, wherein the replacement is selected from the group consisting of a new data object, a new code statement, and a combination thereof; and
adding the origin and the replacement in the technical specification for the incident.

5. The computer program product of claim 4, said creating said at least one backward data flow comprising:
assigning the correct data value of the first problem object to the first problem object in a last code statement of said at least one code statement in the incident flow;
recalculating said at least one assignment object from the correct data value of the first problem object;
determining that said first assignment object has the initial input value; and
generating a first backward data flow of said at least one backward data flow for the first problem object.

6. The computer program product of claim 5, said generating the candidate fault list comprising:
identifying a first code statement of the at least one code statement as a first candidate fault;
simulating a new data flow by applying a different set of input values for said at least one assignment object;
determining that respective values of the new data flow and the first backward data flow are identical; and
adding the first candidate fault in the candidate fault list of the first problem object.

7. A computer system comprising a processor and a computer readable memory unit coupled to the processor, said computer readable memory unit containing instructions that when run by the processor implement a method for automatically correcting an application based on runtime behavior of the application, said method comprising:

said processor receiving incident details of an incident of the application from a first user or a ticketing tool, wherein the incident is an erroneous run of the application in which an incorrect data value of a first problem object of at least one problem object was determined such that the incorrect data value had not been expected by the first user and differs from a correct data value of the first problem object that had been expected by the first user;

said processor receiving an initial input value for a first assignment object;

after said receiving the initial input value for the first assignment object, said processor identifying and storing from the incident details an incident flow comprising the first problem object, at least one assignment object that affects the first problem object within the application, and a set of code statements of the application in which the at least one assignment object affects the first problem object, said at least one assignment object comprising the first assignment object;

said processor creating and storing a forward data flow of the incident flow by tracking data values of the incident flow of at least one code statement that had been actually performed from the beginning of the application up to the incident with respect to the first problem object;

said processor creating and storing at least one backward data flow of the incident flow by simulating the data values of the incident flow, in an order reverse to actual performance of the application, from the correct data value of the first problem object to the initial input value for the first assignment object;

said processor generating and storing a candidate fault list of the first problem object of the incident by use of the forward data flow and the at least one backward data flow;

said processor prompting a second user to examine the forward data flow, said at least one backward data flow and the candidate fault list and receiving a first input from the second user, wherein the first input indicates that the second user approves the generated candidate fault list based on the forward data flow and said at least one backward data flow, and wherein the second user is authorized to update the application;

responsive to receiving the first input from the second user, said processor generating a technical specification that corrects the incident of the application by use of the candidate fault list and a specification of the application;

said processor generating a solution according to the technical specification and generating a resolution that describes the solution for the first user or the ticketing tool;

said processor presenting to the second user the solution and receiving a second input from the second user, wherein the second input indicates that the second user approves the solution; and responsive to receiving the second input from the second user, said processor updating the application with the solution such that the application runs free of the incident and communicating the resolution to the first user or the ticketing tool;

said generating the technical specification comprising:
retrieving at least one candidate fault list including the candidate fault list of the first problem object and retrieving the specification of the application;
identifying an origin of the incident from said at least one candidate fault list;
devising a replacement for the origin, wherein the replacement is selected from the group consisting of a new data object, a new code statement, and a combination thereof; and
adding the origin and the replacement in the technical specification for the incident.

8. The computer system of claim 7, said creating said at least one backward data flow comprising:
assigning the correct data value of the first problem object to the first problem object in a last code statement of said at least one code statement in the incident flow;
recalculating said at least one assignment object from the correct data value of the first problem object;
determining that said first assignment object has the initial input value; and
generating a first backward data flow of said at least one backward data flow for the first problem object.

9. The computer system of claim 8, said generating the candidate fault list comprising:
identifying a first code statement of the at least one code statement as a first candidate fault;
simulating a new data flow by applying a different set of input values for said at least one assignment object;
determining that respective values of the new data flow and the first backward data flow are identical; and
adding the first candidate fault in the candidate fault list of the first problem object.

10. A process for supporting computer infrastructure, said process comprising providing at least one support service for at least one of creating, integrating, hosting, maintaining, and deploying computer-readable code in a computer system that comprises a processor, wherein the code in combination with the computing system is capable of performing a method for automatically correcting an application based on runtime behavior of the application, said method comprising:

said processor receiving incident details of an incident of the application from a first user or a ticketing tool, wherein the incident is an erroneous run of the application in which an incorrect data value of a first problem object of at least one problem object was determined such that the incorrect data value had not been expected by the first user and differs from a correct data value of the first problem object that had been expected by the first user;

said processor receiving an initial input value for a first assignment object;

after said receiving the initial input value for the first assignment object, said processor identifying and storing from the incident details an incident flow comprising the first problem object, at least one assignment object that affects the first problem object within the application, and a set of code statements of the application in which the at least one assignment object affects the first problem object, said at least one assignment object comprising the first assignment object;

said processor creating and storing a forward data flow of the incident flow by tracking data values of the incident flow of at least one code statement that had been actually performed from the beginning of the application up to the incident with respect to the first problem object;

said processor generating a solution according to the technical specification and generating a resolution that describes the solution for the first user or the ticketing tool;

said processor presenting to the second user the solution and receiving a second input from the second user, wherein the second input indicates that the second user approves the solution;

responsive to receiving the second input from the second user, said processor updating the application with the solution such that the application runs free of the incident and communicating the resolution to the first user or the ticketing tool;

said processor prompting a second user to examine the forward data flow, said at least one backward data flow and the candidate fault list and receiving a first input from the second user, wherein the first input indicates that the second user approves the generated candidate fault list based on the forward data flow and said at least one backward data flow, and wherein the second user is authorized to update the application;

responsive to receiving the first input from the second user, said processor generating a technical specification that corrects the incident of the application by use of the candidate fault list and a specification of the application;

said processor generating a solution according to the technical specification and generating a resolution that describes the solution for the first user or the ticketing tool;

said processor presenting to the second user the solution and receiving a second input from the second user, wherein the second input indicates that the second user approves the solution; and responsive to receiving the second input from the second user, said processor updating the application with the solution such that the application runs free of the incident and communicating the resolution to the first user or the ticketing tool;

said generating the technical specification comprising:
   retrieving at least one candidate fault list including the candidate fault list of the first problem object and retrieving the specification of the application;
   identifying an origin of the incident from said at least one candidate fault list;
   devising a replacement for the origin, wherein the replacement is selected from the group consisting of a new data object, a new code statement, and a combination thereof; and
adding the origin and the replacement in the technical specification for the incident.

11. The process of claim 10, said creating said at least one backward data flow comprising:
   assigning the correct data value of the first problem object to the first problem object in a last code statement of said at least one code statement in the incident flow;
   recalculating said at least one assignment object from the correct data value of the first problem object;
   determining that said first assignment object has the initial input value; and
   generating a first backward data flow of said at least one backward data flow for the first problem object.

12. The process of claim 11, said generating the candidate fault list comprising:
   identifying a first code statement of the at least one code statement as a first candidate fault;
   simulating a new data flow by applying a different set of input values for said at least one assignment object;
   determining that respective values of the new data flow and the first backward data flow are identical; and
   adding the first candidate fault in the candidate fault list of the first problem object.

\* \* \* \* \*